United States Patent
Froloff (10) Patent No.: US 9,522,732 B1
(45) Date of Patent: Dec. 20, 2016

(54) UNMANNED AERIAL VEHICLE PERCHING MANEUVER

(71) Applicant: Walt Froloff, Aptos, CA (US)

(72) Inventor: Walt Froloff, Aptos, CA (US)

( * ) Notice: Subject to any disclaimer, the term of this patent is extended or adjusted under 35 U.S.C. 154(b) by 0 days.

(21) Appl. No.: 15/008,292

(22) Filed: Jan. 27, 2016

(51) Int. Cl.
| | |
|---|---|
| B64C 25/32 | (2006.01) |
| B64C 39/02 | (2006.01) |
| B64C 27/08 | (2006.01) |
| B64C 19/00 | (2006.01) |

(52) U.S. Cl.
CPC ............. B64C 39/02 (2013.01); B64C 19/00 (2013.01); B64C 27/08 (2013.01); *B64C 2201/127* (2013.01); *B64C 2201/146* (2013.01); *B64C 2201/18* (2013.01)

(58) Field of Classification Search
CPC .......... B64C 39/02; B64C 27/08; B64C 19/00; B64C 2201/127; B64C 2201/18; B64C 2201/146

See application file for complete search history.

(56) References Cited

U.S. PATENT DOCUMENTS

| | | | | |
|---|---|---|---|---|
| 7,714,536 | B1 * | 5/2010 | Silberg ................. | B60L 11/002 191/10 |
| 2011/0204188 | A1 * | 8/2011 | Marcus .............. | B64C 29/0058 244/23 B |
| 2016/0114887 | A1 * | 4/2016 | Zhou ........................ | B60F 5/02 348/148 |

* cited by examiner

*Primary Examiner* — Richard Camby (57) ABSTRACT

A personal drone with much extended air time. A portable retractable-extendable clawed drone with automated perching function. Perching, landing on a target horizontal edge or a wire, a building trim, a lamp or sign, a shelf, almost any small horizontal edge with a little surface, for video streaming without using up power on hovering or flight, thus conserving power indefinitely. A veritable fly-on-the-wall multi-rotor drone having mechanical claws and automated perching function.

18 Claims, 7 Drawing Sheets

UNMANNED AERIAL VEHICLE PERCHING MANEUVER

BACKGROUND

Field of the Invention

The present invention generally relates to the field of unmanned aerial vehicles and more specifically to automated control maneuver for a multi-rotor craft.

First-Person View (FPVs) are remotely-controlled vehicles piloted via a video feed from the craft itself. The opposing system is Line-of-Sight (LOS), which refers to more conventionally standing at a distance and manipulating the craft by sight. Airborne multi-rotor craft supported by more than two propellers include quadcopters, tricopters, hexacopters, quadrotors and more. Usually, rotors are arranged symmetrically and in the same horizontal plane. Lift is generated by a set of vertically oriented rotors.

Multi-rotors flown using an FPV system are classified as Unmanned Aerial Vehicles (UAVs) or Unmanned Aerial Systems (UASs). The informal term most commonly used is drones, although the hobby generally prefers avoiding that label to maintain an appropriate disparity with large-scale drones used in combat. More importantly, most UAV are specifically designed to hold a camera. Cloud or WiFi streaming from the camera is possible as long as it does not interfere with the remote control.

Control

In controlling a UAV, the pilot has absolute, precise control over the motor. A nudge of the throttle translates to a proportional increase in RPM. The same is true of input to the control surfaces, and other parts involved in changing speed or direction. The distinction with multi-rotors, whether or not advantageous, is that no human is capable of controlling the rotational speeds of three or more motors simultaneously with enough precision to balance a craft in the air. Hence the need for flight controllers.

A flight controller (FC), typically a small circuit board of varying complexity functions to direct the RPM of each motor in response to input. A command from the pilot for the multi-rotor to move forward is fed into the flight controller, which determines how to manipulate the motors accordingly. The majority of flight controllers also employ sensors to supplement their calculations. These range from simple gyroscopes for orientation to barometers for automatically holding altitudes. GPS can also be used for auto-pilot or fail-safe purposes.

With a proper flight controller setup, a pilot's control inputs should correspond exactly to the behavior of the craft. Flight controllers are configurable and programmable, allowing for adjustments based on varying multi-rotor configurations. Gains or PIDs are used to tune the controller, yielding quick, locked-in response. Various software environments are available to write specific settings and modes. One such in the multi-rotor market is OpenPilot, an open-source community dedicated to perfecting flight control algorithms. Also viable is the MultiWii open source software project and Arduino board. Developers have a choice between multiple flight modes, support for a gimbal, typically used to mount a camera for recording, camera trigger output, and a full GUI.

Many flight controllers allow for different flight modes, selectable using a transmitter switch. An example of a three-position setup might be a GPS lock mode, a self-leveling mode, and a manual mode. Different settings can be applied to each profile, achieving varying flight characteristics. One of the most common materials for multi-rotor frames is carbon fiber. A great many of its physical properties are perfectly suited. However, carbon fiber is known to block radio signals, which is obviously not ideal for a craft using multiple transmissions.

Quadcopters, a subset of UAVs, generally use two pairs of identical fixed pitched propellers; two clockwise (CW) and two counter-clockwise (CCW). These use independent variation of the speed of each rotor to achieve control. By changing the speed of each rotor it is possible to specifically generate a desired total thrust; to locate for the centre of thrust both laterally and longitudinally; and to create a desired total torque, or turning force. These quadcopters can be flown indoors as well as outdoors.

However, as size increases, fixed propeller quadcopters develop disadvantages. Increasing blade size increases their momentum. This means that changes in blade speed take longer, which negatively impacts control. At the same time, increasing blade size improves efficiency as it takes less energy to generate thrust by moving a large mass of air at a slow speed than by moving a small mass of air at high speed. Therefore, increasing efficiency comes at the cost of control Propellers There are many other components and equally vital are the propellers. The variety of props is arguably greater than any other component; materials, dimensions, and price span a wide engineered range. Some propeller induced vibration can be acceptable, bolstering the case for less expensive propellers. But the goal of producing well-shot footage will require more expensive propellers or other solutions.

Speed Controllers and PIDs

Electronic speed controllers (ESCs) are used in many applications. They translate signal to electrical supply to rotate the propeller(s). On a multi-rotor, every motor gets its own ESC, each of which connects to the flight controller. After computing the inputs, the controller directs each ESC to adjust its speed in order for the craft to perform them.

ESC refresh rates vary. For multi-rotors, given the balance of multiple motors critical to the craft's ability to stay airborne, high refresh rates are more important. The ESCs are essentially programmable microcontrollers, and they employ firmware to define and carry out their tasks. For optimized multi-rotor use, stripped of irrelevant features, and sporting refresh rates as high as 400 Hz.

Existing UAV control systems integrate a low cost inertial measurement unit, GPS receiver, and magnetometers to generate a navigation solution (position, velocity and attitude estimation) which, in turn, is used in the guidance and control algorithms. At times up to 15 state Extended Kalman Filters are used which integrate the inertial sensor and GPS measurement to generate a high-bandwidth estimate of a UAV's state. Guidance algorithms for generating a flight trajectory based on waypoint definitions are also described. Proportional-Integral-Derivative (PID) controller which uses the navigation filter estimate and guidance algorithm to track a flight trajectory is detailed. PID control can perfectly stabilize a second order plant, given the right gains. These architectures integrate the hardware, software and algorithms.

Power Source

The industry standard battery source is lithium-ion polymer (LiPo) batteries. Although relatively light, battery weight is a significant fraction of the total weight and more than any other component governs time of flight limitations to most all UAVs. What is needed are ways to increase flight time, or better video streaming time, of UAVs using with video or camera recording vantage points.

Video Systems: Cameras And Radio Gear

A good FPV system is defined by its video system. A camera is core and there are various options on UAVs. Some include multiple cameras. The first one, FPV-specific, is typically used for flying the UAV. The second type of video system is typically an HD camera that enables high-quality recording during flight. Outdoors provide advantageous vistas for quadcopters and require good quality camera for capture and stabilization in flight. An option to use the recording camera as a flight camera FPV with video-out cables exists, but quality and light management suffer compared to a purpose-built flight cam.

Compared to recording cameras, FPV "CCD" flight cameras deliver lower contrast, brighter images, and more dynamic response to rapid changes in light. As with most of the components, there are a great many options. All FPV-based setups, by their very nature, consist of a camera and a transmitter on-board, and a receiver and display device on the ground. As with any other broadcast controls, video is transmitted using radio signals. To some extent, choice of frequencies used for transmission are vital because it impacts the hardware, the flight range, and the objects the signal can penetrate. Most Multi-rotors with FPV-based control schemes employ one frequency for the video and another for controlling inputs. These can cause interference for independent controls.

Transmitter

Lower frequencies have much greater penetration through obstacles, and require less transmission power to travel the same distance. Thus lower frequencies are reserved for the transmitter, since control range and penetration take priority over the video feed. Higher frequencies offer few advantages, other than smaller antennas, slightly sharper image transmission, and in some cases, bandwidth availability. The frequencies most often used for FPV are 900 MHz, 1.2 GHz, 1.3 GHz, 2.4 GHz, and 5.8 GHz, with the latter two being most common. Others can be used as well.

Control Systems

The second radio system on an FPV multi-rotor is the control system. Both a transmitter and receiver are needed, and the choice of frequency is an important. There are generally fewer frequencies available for control systems. Most common is 2.4 GHz, though 35 MHz and 72 MHz were popular in the past, also. UHF systems are becoming increasingly prevalent.

Modular Transmitter and Receiver Components

Transmitters are available either as a single unit or, less commonly, as modular pieces. A transmitter shell, sticks, knobs, and switches on their own, without radio hardware, can be found integrated in a transmitter module. Multiple models communicating over different frequencies often find this approach useful, since it's easy to swap out modules.

Off the shelf transmitters come in number of channels they offer. For each remote-controllable action, a unique channel is needed to convey input. The minimum required to pilot a multi-rotor is four channels: throttle, yaw (rotation), pitch, and roll. For every flight mode switch, gimbal control, or lighting control, an extra channel is involved. Most flight controllers recommend eight channels.

On the other end of the control system is a receiver with a corresponding frequency. The number of receiver channels must match the transmitter in order to utilize all of the available functions. The four joy-stick outputs, at least, must be fed to the flight controller in order to control a multi-rotor.

Protocols for Transmission

There are two protocols for control transmission. The first and most traditional is pulse-code modulation (PCM), a standard analog one-to-one broadcast. It remains both reliable and popular. But increasingly, markets are adopting an alternative: pulse-position modulation (PPM). With PPM, multiple inputs are encoded and transmitted using a single channel. It is advantageous in that it reduces wiring and setup difficulty, allowing for more channels than previously possible. Both schemes work, and neither is deemed more correct than the other. However, not all transmitter/receiver combinations support PPM.

The newer UHF solutions mentioned previously are fundamentally similar to other control systems. However, they operate across a range of frequencies (usually 130 to 135 MHz) and use channel hopping to maintain a strong link for as long as possible. Generally, UHF transmitters are housed in external cases attached to a conventional transmitter using a trainer port. At such low frequencies and relatively high power, UHF systems are considered standard for long-range applications, with connections reaching out several miles and passing through obstacles with comparative ease.

Multi-rotor are a subset of drones which are mechanically simple, having n motors and n propellers, and camera(s). These are currently in the hobby and toy markets for the obvious limitations of flight duration and manual control requirements. What is needed are UAV functions enabling more indoor and urban uses.

Inexpensive multi-rotors do not require complex mechanical parts to control flight and can fly and move only by changing motor speed. This imparts severe limitations for control by only manual control via electronic/computer-based systems However, over 70% of these type of multi-rotors, can fail and drop as objects, striking or colliding with objects or structures in a damaging way. Excessive vibration and extreme conditions, heavy lifts, moves and activities where forces are applied can lead to flight failure and subsequent crashing. Better more solid stabilization and control for video production is needed for extended video takes.

Some of the contributing factors for falling multi-rotors are 1) unnecessary distractions while undertaking a task, 2) not following the plan or procedure, 3) failure to recognize and manage change, 4) lack of experience or knowledge of the pilot, and 5) lack of surroundings awareness. What is needed are functions that reduce the burden of manual manipulation for advantageous functionality, whereby distractions, lack of planning or experience and surrounding awareness can be momentarily alleviated without flight power consumption, but still providing an advantageous vantage point for the camera.

Hence what is needed are UAVs that can overcome inadvertently or accidentally falling while recording. What are also needed are UAVs which can have longer effective "flight time" for longer surveillance and recording opportunities between recharges.

SUMMARY

The present invention discloses a multi-rotor craft with perching function using a claw mechanism coupled to the craft body. The craft housing contains electronics for controlling mechanical components for controlling a multi-rotor, the electronics includes a flight control system having a processor electronically coupled with supporting electronic components, array of rotors, sensor array, power source, at least one wireless receive-transmitter pair and at least one camera. Each rotor electrically connected to an electronic speed controller for controlling a propeller, the electronic speed controllers translating commands from the processor for commandeering the rotor array in synchronous and specific rotor operations providing specific flight dynamics. The controller reads instructions from a receiver for commandering the electronic speed controllers in directing synchronized rotor array operations configured for a programmed set of specific flight dynamics for maneuvering the craft. The controller translates instructions from the remote wireless transmitter with logic and data inputs from basic onboard instrumentation and sensors. The sensor array comprises a 3D accelerometer, 3D magnetometer, 3D gyro and range finder, the receiver having a communication channel assigned for camera gimbal pitch angle control for remote user selected viewing. An extendable mechanical claw slidably and pivotably coupled to the craft body for easy fold up facilitates the perch landing. Components for logic for identifying a 3D target horizontal edge from camera image processing of 2D images and user selection from the image, logic for user selected target horizontal edge lock-on are also included. The perching maneuver logic is responsive to real-time range data from rangefinder for positioning the craft above the target horizontal edge, the perching maneuver logic using rangefinder data for approaching and positioning the multi-rotor craft from above and adjacent to the target horizontal edge corner vertical virtual surface for descending at a craft pitch angle within proximity to engage the craft claw with the horizontal edge surface so that the engaged claw suspends the craft over the target edge in a manner providing a stable vantage position for the camera.

BRIEF DESCRIPTION OF DRAWINGS

Specific embodiments of the invention will be described in detail with reference to the following figures.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

OBJECTS AND ADVANTAGES

The present invention discloses an automated control for a UAV perching function. An object of the invention is to automate a docking with a ledge, crack, trim, wire or other horizontally protrusion from an otherwise flat vertical surface, by which the docking is accomplished with a UAV mechanical claw mechanism.

Another object of the invention is to provide more camera or video time for a UAV without expending flight battery power.

Yet another object of the invention is to provide a way for users to position their video takes from easily settable yet hard to reach vantage points.

Another object of the invention is to provide a way for users to position their camera takes from maintainable advantageous vantage points without need for elevation props or ladder placement.

Yet another object of the invention is to provide a personal or private drone, designed for small pocket portable form factors.

Another object of the invention is to provide useful functionality to a drone to push it beyond the toy and hobby markets and into a much larger consumer market.

Embodiments of the Invention

Specific embodiments of the invention will be described in detail with reference to the following figures.

Figure 1:
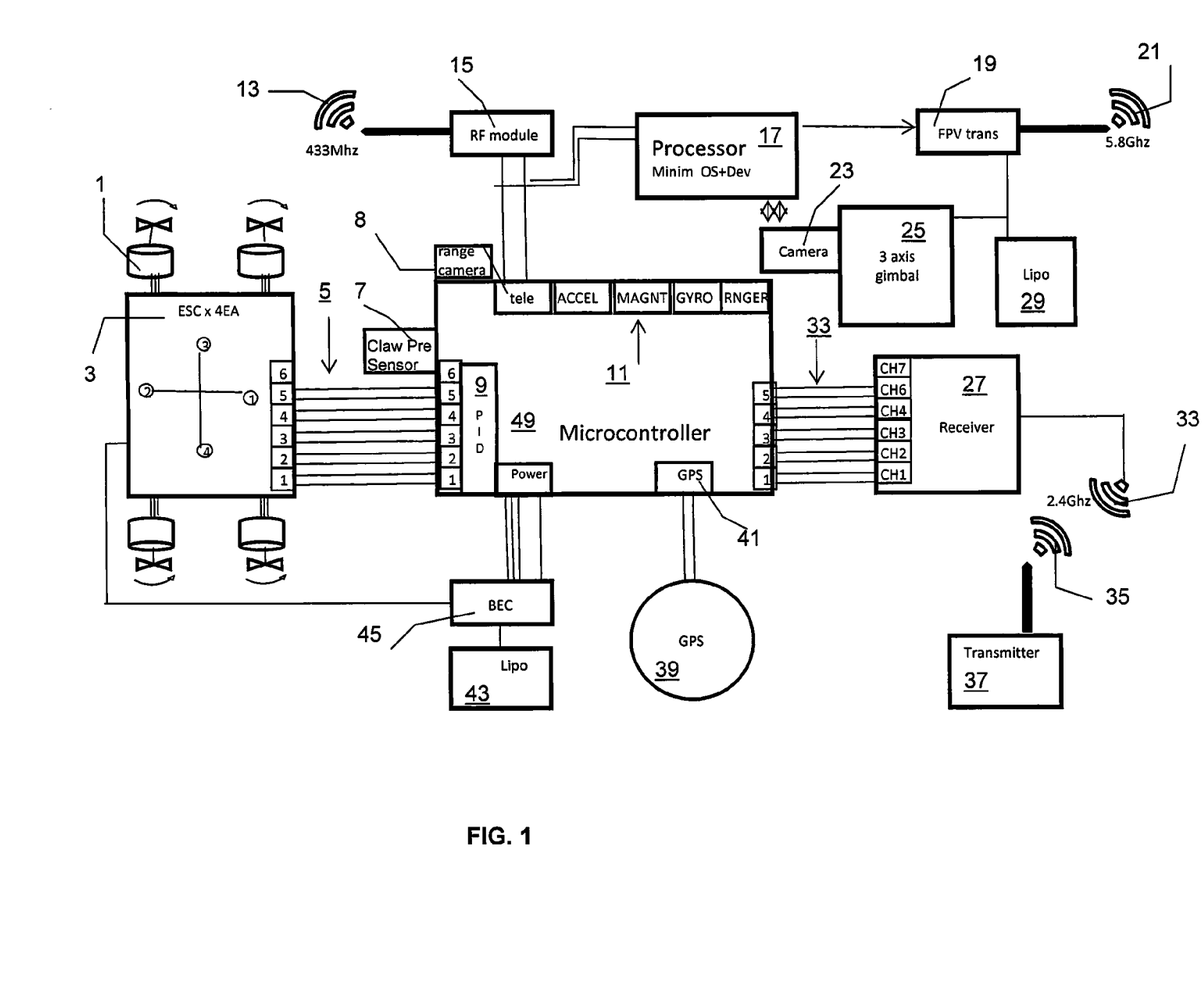
FIG. 1 is a schematic of the perching maneuver UAV in an embodiment of the invention.

FIG. 1 is a schematic of the perching maneuver UAV in an embodiment of the invention. A UAV Flight Control (FC) system includes a processor 17 and a microprocessor 49 electronically connected with many supporting electronics and sensors 7 11 41. Software development environments at typically made for the more popular FC systems. In an embodiment, the schematic in FIG. 1 represents a quadcopter multi-rotor, aka copter, which includes an array of four rotors 1 and attached propeller electrically connected to an Electronic Speed Controller (ESC). The ESC translate signal to electrical power. so that every motor 1 gets its own ESC, each of which connects 5 to the flight controller 49 which provides instructions on rotor RPM required. After computing the inputs, the controller directs each ESC 3 to adjust its speed in order for the craft to perform the rotor function individually needed for flight maneuvers. In short the electronic speed controllers translate commands from the processor for commandeering the rotor array in synchronous and specific rotor operations providing specific flight dynamics. The ESCs are generally powered 45 from battery 43. In an embodiment the ESCs 3 can incorporate PIDs 9 for correcting actual realtime deviations of the flight along a plotted trajectory.

Ground control signal 37 are sent by antenna 35 to a drone receiving antenna 33 to a receiver 27 coupled 5 to the controller 49. The controller manages instructions from the ground with the aid of basic onboard instrumentation and sensors 7 11 23 39 including 3D accelerometer, 3D Magnetometer, 3D Gyro and a range finder. Rangefinder sensors can be ultrasound 7, RF 15, stereoscopic camera 23, laser, trigonometric based stadiometric or parallax, or visual FVC. The controller translates instructions from the remote wireless transmitter with logic and data inputs from basic onboard instrumentation and sensor array. A sensor array may include a 3D accelerometer, 3D magnetometer, 3D gyro and range finder for a sensor fusion architecture. In an embodiment a receiver 21 will have a channel 33 assigned for camera 23 gimbals 25 pitch control.

In some embodiments sensor fusion may be applied for combining of sensory 7 11 23 39 data or data derived from disparate sensor sources 11 such that the resulting information has more reliability or high resolution than would be possible when these sources were used individually.

In an embodiment a stereoscopic vision ranging camera 8 will provide images for calculation of depth information by combining two-dimensional images from two cameras at slightly different viewpoints for locking on to a 3D edge, trim, window sill, picture, frame, cupboard or cabinet top, or horizontal crack shown from a 2D image analysis, forming a horizontal line object. In another embodiment of the invention. GPS 39 41 offers assistance to guide the copter with use of indoor location based services (LBS).

In an embodiment of the invention the FPV guided multi-rotor has a second radio system is used for steering control. Both a transmitter 37 35 and receiver 27 33 are needed, and the choice of frequency are available for control system communication. Most common is 2.4 GHz, though 35 MHz and 72 MHz exist in some embodiments along with UHF. The receiver 27 communicates 33 directly to the microcontroller 49 which then manages the flight dynamic commands.

Hence the electronics include a flight control system having a processor electronically coupled with supporting electronic components, array of rotors, sensor array, power source, at least one wireless receive-transmitter pair and at least one camera.

Figure 2:
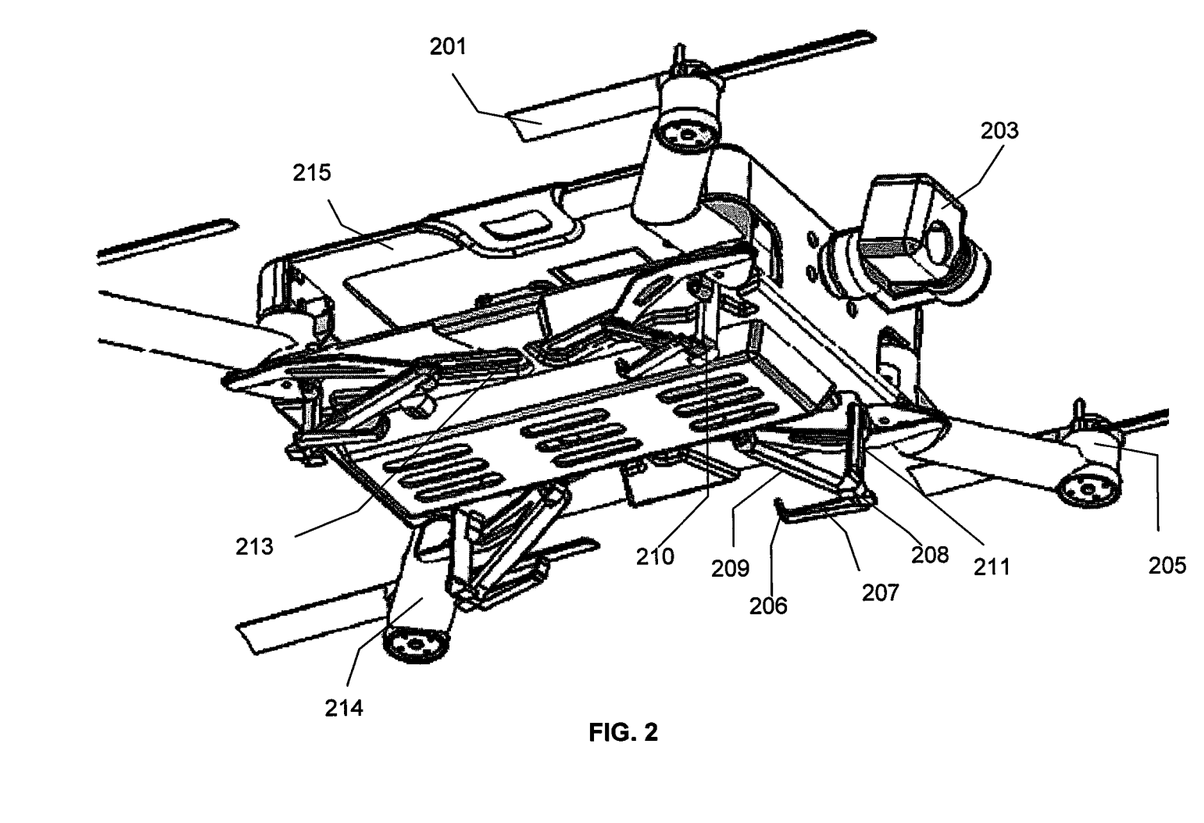
FIG. 2 is an isometric drawing of the perching claw structures on a copter in an embodiment of the invention.

FIG. 2 is an isometric drawing of the perching claw structures on a copter in an embodiment of the invention. A copter housing 215 structurally supports the copter internal components including at least one camera 203. Mechanical claw structures are attached at the base of the rotors 214. Each claw structure has a segment that is pivotally coupled to the copter. In and aspect of a claw structure a pivotally attached segment is coupled to a slide 213 segment slidably coupled at hinge joint 208 on the craft and support a outwardly pivoting segment 207 with a smaller hooking nail-like claw segment 207. Thus the claw mechanism is integrated with deployable-retractable landing gear extensions. A virtual line between the claw joints 208 2010 forms a default line for parallel alignment to a target horizontal edge. Each rotor 205 is electrically connected to an electronic speed controller for controlling a propeller 201.

Figure 3:
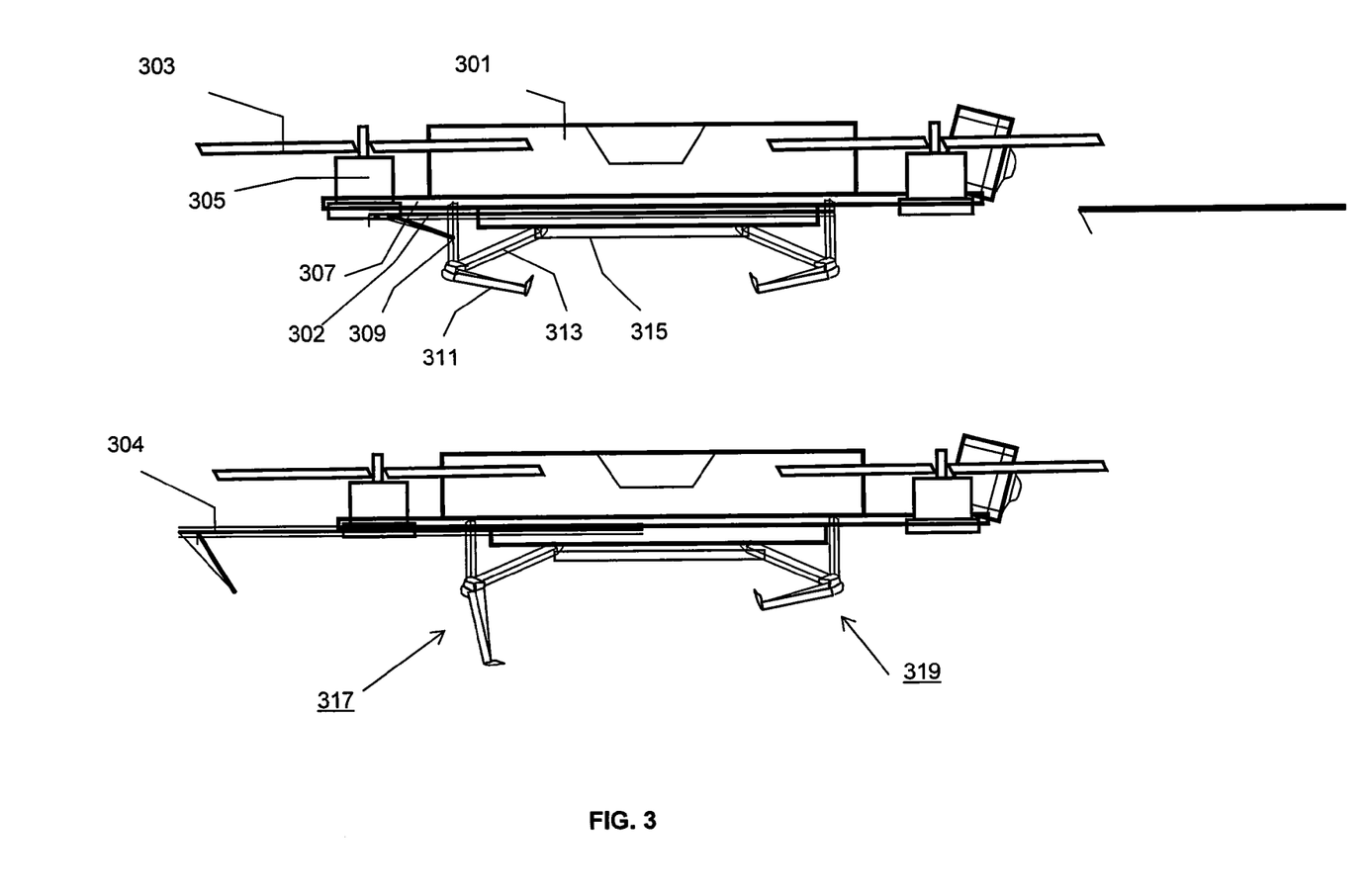
FIG. 3 shows a side view schematic of the perching claw structure on a copter in an embodiment of the invention.

FIG. 3 shows a side view schematic of the perching claw structure on a copter in an embodiment of the invention. A housing 301 encloses and support the internals, 4 rotors 305 and associated propellers 303 are shown rigidly attached 307 protruding outwardly from the housing 301. Two sets of claw structures 317 319 are shown. Each claw includes a base 309 segment, a sliding 313 segment, a slider 315 and a claw gripping 311 segment. There can be independence of deployment as shown the camera far claw 317 is deployed while the camera near 319 maintains a tight folded configuration. The claw structures maybe foldable or not depending on the embodiment design. Thus in an embodiment rotor booms house claws in deployable-retractable recursive segments.

In another embodiment a claw structure 302 is slidably attached with a claw to coptor pivot coupling to the coptor underside. This claw is shown extended out and deployed 304. Thus in an embodiment the claw mechanism is slidable out from the craft with anchor pivoting handle end to craft and distal end claw hook. Both of these embodiments implement a foldable deployable claw mechanism which provides a more portable character to a copter.

Figure 4:
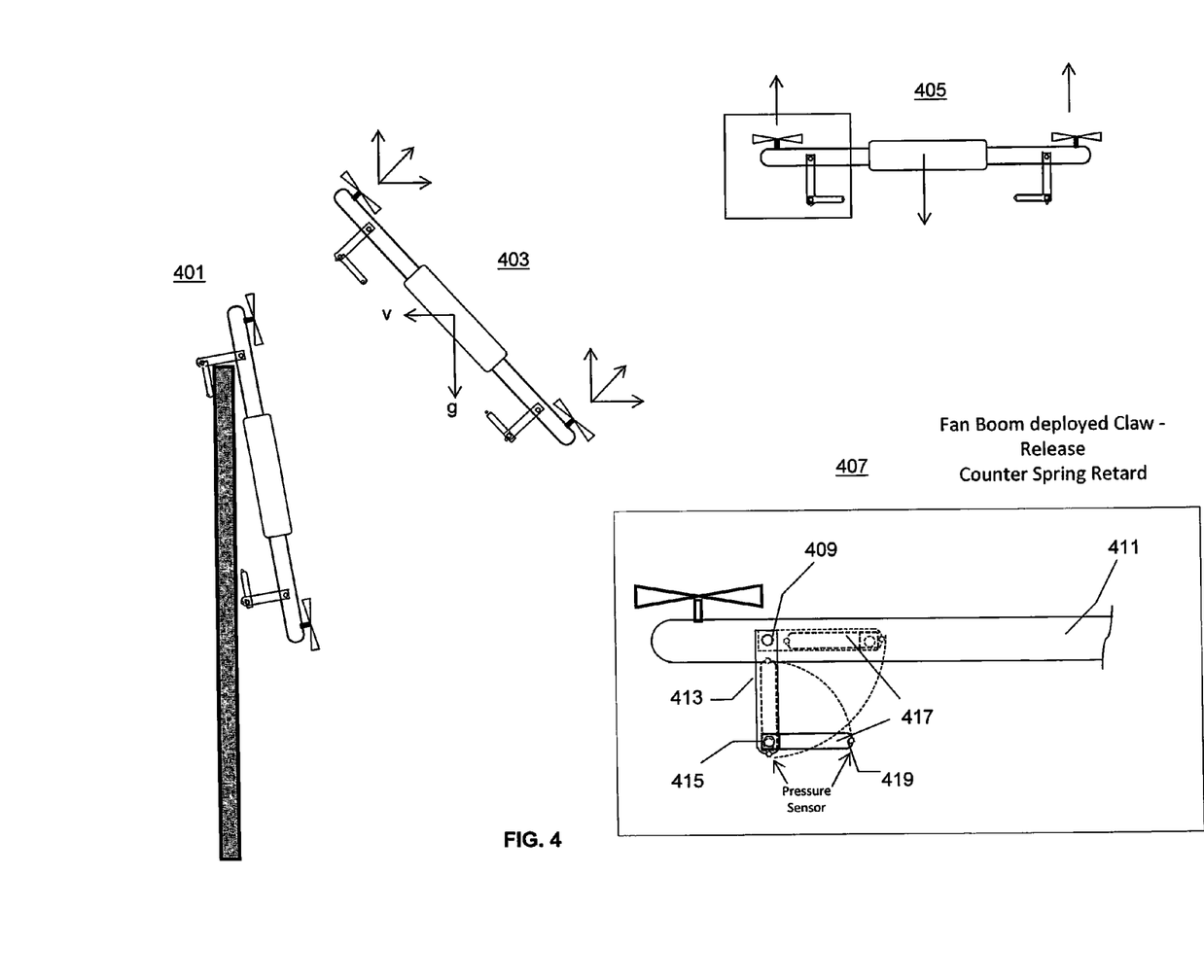
FIG. 4 illustrates the phases of a perching maneuver with a rotor boom claw in an embodiment of the invention.

FIG. 4 illustrates the phases of a perching maneuver with a rotor boom claw mechanism in an embodiment of the invention. The first phase 405 has the copter at a distance from the target horizontal edge maintaining a horizontal flight position. This self-leveling position can be an operational mode result establishing a safe position to be activated upon sensing free fall from the accelerometer data onboard or simply an automated programmed process on initiated by user. The arrows show propeller vertical lift thrust forces opposing the gravity force to provide net lift. In tilt rotor coptors the copter body need not be completely horizontal to have the full rotor thrust vector working against gravity force. Thus in most copters the thrust vector works against approaching a wall with a pitch angle forward and some momentum must be available to move into proper perching position. The second phase 403 shows the copter in claw line parallel alignment with the THE and with a pitched copter angle in preparation for final approach perching. The vectors show the coptor has a velocity toward the THE opposing the rotor thrust in slowing the copter as it approaches the THE. The third phase 401 shows the copter in perching position with claw attached to the THE surface.

In a claw fan boom 407 embodiment the rotor or fan boom segment 411 houses a deployable claw mechanism in two pivotably connected 413 417 segments, pivotably at hinge points 409 and 415 respectively. These may be spring loaded for deployment and counter spring retard retractable. Pressure sensors are placed on the distal segment 417 at the ends 415 419 for programmability of knowing exactly when contact is made so that perching can be completed. In yet another embodiment, the claw 302 slidably attached to the craft housing 307 on a body lengthwise handle shown stowed position and extendable out 304 upon deployment. This embodiment allows for a slightly longer distance away from the target horizontal edge and simplicity in design. The end of the claw handle may be coupled by a pivot joint to allow more flexibility in the perch maneuver final approach.

Figure 5:
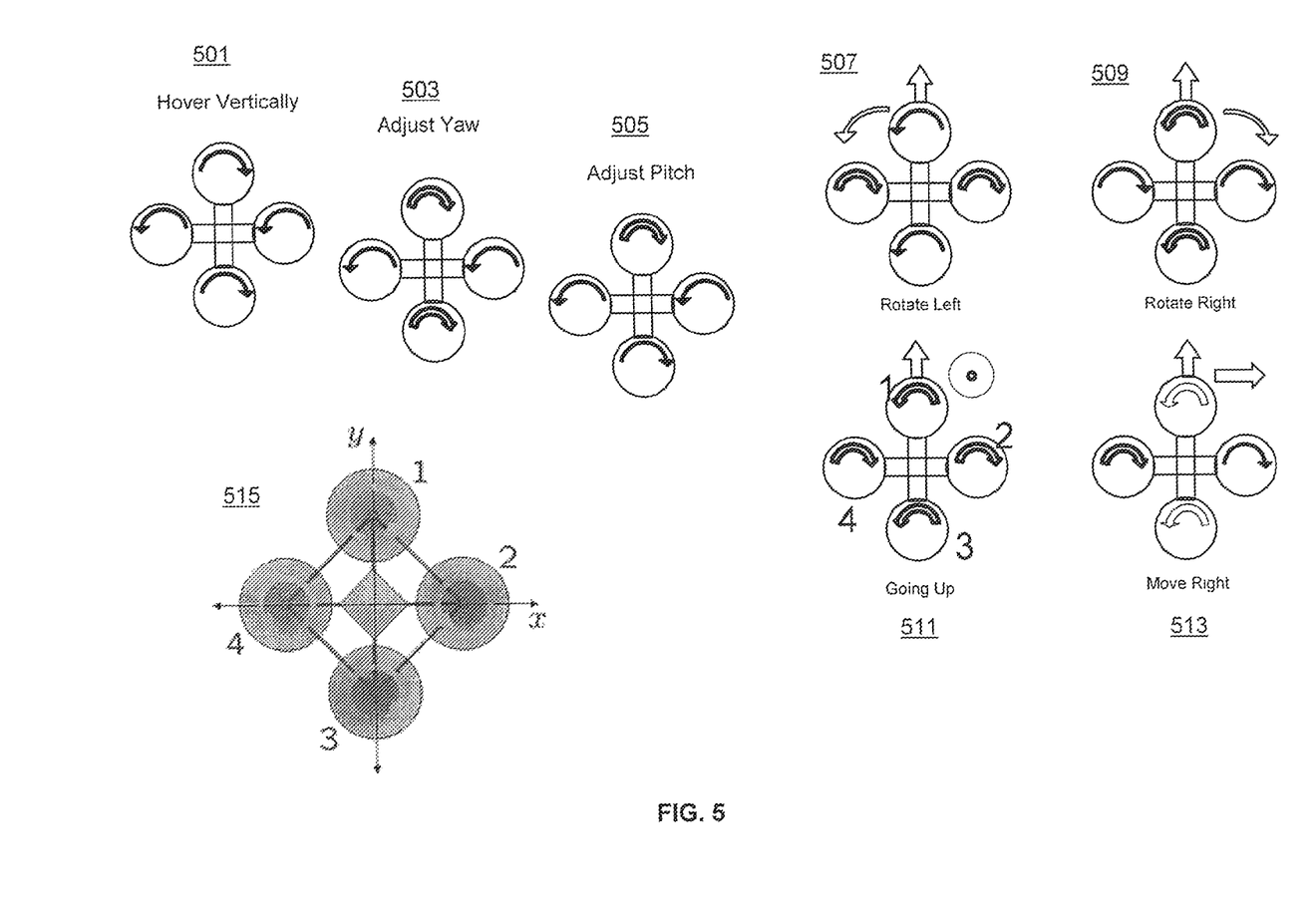
FIG. 5 shows a quadcopter rotor power configuration for flight dynamics in an aspect of the invention

FIG. 5 shows a quadcopter rotor power configuration for individual flight dynamics in an aspect of the invention. A user's control input command should correspond exactly to the flight behavior of the craft. Flight controllers are configurable and programmable, allowing for adjustments based on varying multi-rotor configurations. Gains or PIDs are used to tune the controller, yielding a programmed response in as far as a user's input and craft flight input. The controller reads instructions from a receiver for commandering the electronic speed controllers in directing synchronized rotor array operations configured for a programmed set of specific flight dynamics as shown for ultimately maneuvering a multi-rotor craft vehicle in a automated fashion.

Specific flight dynamics such as, hover, adjust yaw, adjust pitch, move up, move right, turn right or left, require the rotor array configuration labeling 515 such that individual rotors operating in concert provide net torques and on a quadcopter aircraft, due to synchronization of individual spinning rotors on commands which do not work in cross purposes to over all commands for flight dynamics along a trajectory. For example the curled arrows show rotors 1 and 3 spin in one direction, while rotors 2 and 4 spin in the opposite direction, yielding opposing torques for a controlled flight to hover vertically 501.

Each rotor produces both a thrust and torque about its center of rotation and are numbered as shown 515 for explanation use. If all rotors are spinning at the same angular, with rotors one and three rotating clockwise and rotors two and four counterclockwise, the net aerodynamic torque, and hence the angular acceleration about the yaw axis is exactly zero, which implies that the yaw stabilizing rotor of conventional helicopters is not needed. Yaw is induced by mismatching the balance in aerodynamic torques i.e., by offsetting the cumulative thrust commands between the counter-rotating blade pairs.

The major flight control motions are produced through the application of rotor thrust and torque as applied to the combination of rotors as shown. The thickness of the rotation arrow represent the relative magnitude of the rotor thrust produced. A quadrotor hovers 511 or adjusts its altitude by applying equal thrust to all four rotors. A quadrotor adjusts its yaw 503 by applying more thrust to rotors rotating in one direction. A quadrotor adjusts its pitch 505 or roll by applying more thrust to one rotor and less thrust to its diametrically opposite rotor. A quadrotor hovers vertically 501 by maintaining uniform rotor power across the rotors. A quadrotor rotates left 507 by providing higher thrust to rotors 2 and 4. A quadrotor rotates right 509 by providing higher thrust to rotors 1 and 3. A quadrotor moves right 513 by reducing rotor 2 thrust relative to 4 and maintaining rotors 1 and 3.

Figure 6:
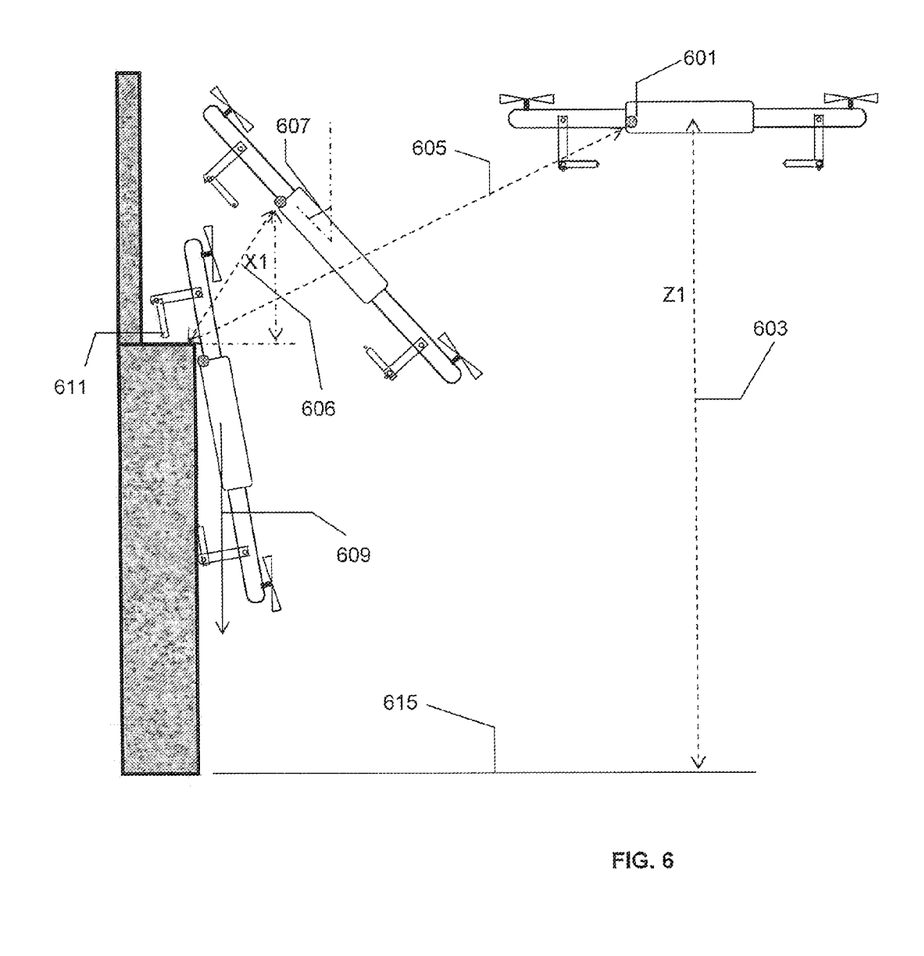
FIG. 6 is a pictorial illustration of a perching maneuver for a quadcopter in an embodiment of the invention.

FIG. 6 is a pictorial illustration of a perching maneuver for a quadcopter in an embodiment of the invention. A processor contains logic for identifying a 3D target horizontal edge from camera image processing of 2D images and displaying to user for selection from the transmitted 2D image. The craft rangefinder 601 distance 605 and trajectory is locked-on to the THE at a reference height Z1 603 from reference ground 615 where geometry for the trajectory to THE are determined. The craft proceeds to a default distance relative X1 606 to the THE at the final approach and orients its pitch 607 to be aligned just above the THE. In an embodiment a PID controller which uses a navigation filter estimate and guidance algorithm to track a fight trajectory. The difference between the measurement and the reference, the error, is fed into the PID block and an output is generated from the three gains: Kp, the proportional gain is multiplied directly by the error, Kd, the derivative gain is multiplied by the time rate of change of the error, and lastly, Ki, which multiplies the integral of the error receive from actual distance and calculated trajectory.

The final approach entails verification of default distance and pitch orientation of the craft for a slowed descent to engage the claw tip 611 with the target horizontal edge surface, all the while measuring its downward acceleration 609 and claw tip 611 pressure for contact vs. missing the THE perch position. With attitude estimation established from realtime rangefinder data, and inner loop stabilizing the craft, the guide along the desired trajectory can overcome disturbances such as wind. Moreover, the altitude and speed for the trajectory to the THE, can involve several legs which can be blended into each other using circular arcs to reduce over flight errors.

Figure 7:
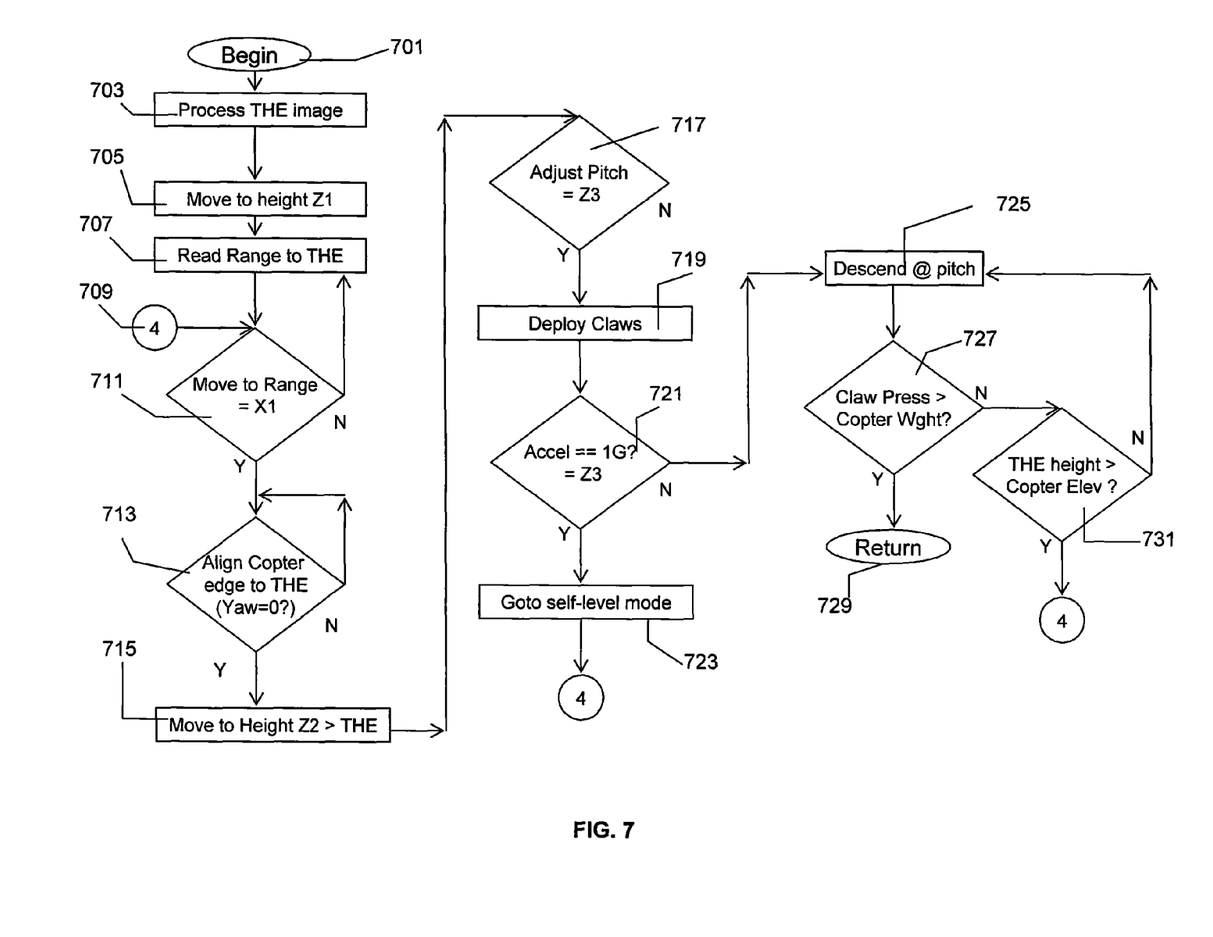
FIG. 7 is a flow diagram of a perching maneuver in an embodiment of the invention.

FIG. 7 is a flow diagram of a perching maneuver in an embodiment of the invention. An onboard camera image 705 is presented on users display device, image which is processed for graphical artifacts upon user selection. Whether FCV or LOS, the camera sends images to processor 705 data defining a single two dimensional image or two stereoscopic views of the same image. An image analyzing module configured to receive the data and analyze the two dimensional image determines a two dimensional orientation representative of a three dimensional orientation and position. The image will provide input to select a linear more-or-less horizontal or slowly inclined 3D object from the image, for locking on a target horizontal edge (THE). The real 3D artifact or object can be a 3D edge surface such as trim, window sill, picture top, frame, cupboard or cabinet top, horizontal crack or linear opening, wire, cable, etc shown from a 2D image analysis, forming a horizontal line object in the image.

The processor 17 will execute logic for locking on to the selected target horizontal edge (THE) object position and receives the two dimensional orientation from an image analyzing module to determine the three dimensional orientation and position of a candidate THE center point. Information relating to the three dimensional orientation and position of the THE can be had by many alternate methods. Upon determining an orientation and position of an object THE at user selection or input 701 locks the THE center as the perching destination point for the perching maneuver landing module 701.

Methods for performing lock-on can include, for example, using Euler's angles in a matrix to represent the entire object at once. Determining an orientation and position of an object THE can include a computation device having an input module 705 adapted to receive data defining a two dimensional image, an image analyzing module configured to receive the data and analyze the two dimensional image to determine a two dimensional orientation representative of a three dimensional orientation and position, a position calculating module configured to receive the two dimensional orientation from the image analyzing module and determine the three dimensional orientation and position of the object. This output information relating to the three dimensional orientation and position of a midsection THE is sent on for calculation to adjusting rotor ESC command pitch, yaw, forward, backward, up or down in an adaptive manner, while accepting range, acceleration and or claw sensor data.

In some embodiments, an image analyzing module will include a background subtraction component configured to reduce interference associated with the data defining the two dimensional image. The image analyzing module can also include a centroid calculating component configured to define a centroid of one or more pixels of the image.

In another embodiment of the system for determining an orientation and position of an object, the position calculating module can include a processing component configured to process a series of linear equations to determine the three dimensional orientation and position of the object. In some embodiments, the series of linear equations is a Taylor series of equations. In still other embodiments, boundary conditions to a series of linear equations can be used to determine the THE position.

Lock-on to a THE can also be had through situational data stored for use in simplifying the determination of the three dimensional orientation and position and in some embodiments can include boundary assumptions relating to the range of expected orientations of the object defined by a range of rotation angles about axes passing through the center of mass of the THE object. The expected orientations can relate to operational limits and conditions of the object and, for example, the range of rotation angles can include a range of angles about a longitudinal direction of the THE. In another embodiment, the range of rotation angles can include a range of angles about one or more directions transverse to the direction of travel. In some embodiments, the situational data can be adjustable based on the object and conditions for which the orientation and position are being determined. In still other embodiments, the situational data can include relationship information between the object and a position indicator associated with the object.

In another embodiment, a method for determining an orientation and position of an THE can include receiving image data and storing the image data in a computer readable storage medium, the image data including a two dimensional depiction of the object, and using a computation device having one or more modules for accessing the image data and determining the orientation and position of the object. The determining can include analyzing the image data to determine a two dimensional orientation that is representative of a three dimensional position and orientation of the object and performing a three dimensional analysis limited by boundary conditions to determine the three dimensional orientation and position of the object. In some embodiments, performing a three dimensional analysis can include processing a system of linear equations, such as a Taylor series.

In yet another embodiment, the method of determining an orientation and position of a THE for lock-on can include applying boundary conditions to limit the variables associated with the three dimensional position and orientation of the object, wherein the boundary conditions relate to the range of expected orientations of the object defined by a range of rotation angles about axes passing through the center of mass of the THE object. In some embodiments, the expected orientations can relate to operational limits and conditions of the object. For example, the range of rotation angles can include a range of angles about a longitudinal direction of extension. In another embodiment, the range of rotation angles can include a range of angles about one or more directions transverse to the direction of THE travel. In still other embodiments, the boundary conditions can relate to a known relationship between the position indicator orientation and the object orientation such as known horizontal orientation of pictures, frames, trim, shelves, horizontal borders, horizontal boundary demarcations, wires, cables, etc.

Programmatically issuing the rotor commands configured by the flight controller to manage orientation and flight movement and continuous reading or monitoring the current location, a realtime response trajectory is plotted between the copter position and the target horizontal edge (THE). Spatial angles are computed and rotor thrusters are applied to obtain the flight dynamics to position the coptor to a default self-leveling height 705. In some embodiments self-leveling mid-air positioning is a routine callable at anytime a save event is registered. A "save" even is one whereby the coptor fails and finds itself in free fall.

The distance to the THE is read 707 from the ranger and the distance ranged 711 is further closed to another default distance X1 just above and offset from the THE whereby within a few more adjustments a small descent with coptor angled with claws to engage the THE from above programmatically.

Realtime changes require an iterative loop to maintain a manageable and predictable speed of the copter approach which will be dependent on the rotor thrust produced in the various flight direction modes and distance and the velocity at which the copter arrives in the vicinity of the THE center position. The range or distance is updated in real-time until position X1 is reached, at which time a self-leveling is done. In addition the accelerometer is continuously monitored for a free fall event in which case the self-leveling routine is called and the copter is moved to a safe re-try position 709.

Once proximate default X1 position is attained, the copter's claw orientation 713 must orient the claw(s) parallel to the THE for maximum claw THE engagement. The yaw flight maneuver control will be iteratively 713 applied in aligning the copter claw line with the THE until the claw line is more-or-less parallel. This perching maneuver logic is responsive to real-time range data from rangefinder for positioning and orienting the craft above the target horizontal edge as a certain amount of iteration will is expected for some embodiments.

Logic thread then continues with the claw line a short default Z2 grappling distance 715 to above the THE must be established whereby the copter pitch angle will allow slowed decent and claw engagement with the top surface of the THE.

The copter pitch 717 is then rotated to an angle which upon vertical downward movement will engage the claws with the THE. The may be in the range of 10 to 30 degrees with the vertical axis. If not already done, the claws will be deployed 719 or extended to their engaging position in anticipation of the perching completion. Copter acceleration downward continues to be monitored for free fall 721 prepares for the final approach to perching. In an embodiment the perching maneuver logic using rangefinder data responsively for approaching and positioning the multi-rotor craft from above and adjacent to the target horizontal edge corner vertical virtual surface will be used in descending the craft with sufficient pitch angle within proximity to engage to engage the craft claw with the horizontal edge surface.

Begin descent at pitch 725 flight control aiming copter mid plane to THE for engagement with the THE surface and the claw while descending. Continuously monitor claw pressure sensor 727 for coptor weight pressure. A sensor pressure commensurate with copter weight or set default minimum will trigger a return 729 and successful perching. Iteration through difference in copter elevation and THE elevation 731 is a second check on whether a miss was incurred and the self-leveling mode 709 should be engaged or the descent has not yet reached the claw engagement with THE surface.

While the invention has been described with respect to a limited number of embodiments, those skilled in the art, having benefit of this invention, will appreciate that other embodiments can be devised which do not depart from the scope of the invention as disclosed herein. Other aspects of the invention will be apparent from the following description and the appended claims.

What is claimed is:

1. A multi-rotor craft with perching function using a claw mechanism coupled to the craft body comprising:
   a craft housing containing electronics for controlling mechanical components for controlling a multi-rotor;
   the electronics including a flight control system having a processor electronically coupled with supporting electronic components, array of rotors, sensor array, power source, at least one wireless receive-transmitter pair and at least one camera;
   each rotor electrically connected to an electronic speed controller for controlling a propeller;
   the electronic speed controllers translating commands from the processor for commandeering the rotor array in synchronous and specific rotor operations providing specific flight dynamics;
   the controller reading instructions from a receiver for commandering the electronic speed controllers in directing synchronized rotor array operations configured for a programmed set of specific flight dynamics;
   the controller translating instructions from the remote wireless transmitter with logic and data inputs from basic onboard instrumentation and sensor array;
   the sensor array comprises a 3D accelerometer, 3D magnetometer, 3D gyro and range finder;
   the receiver having a communication channel assigned for camera gimbal pitch angle control for remote user selected viewing;
   an extendable mechanical claw slidably and pivotably coupled to the craft;

logic for identifying a 3D target horizontal edge from camera image processing of 2D images and user selection from the image;

logic for user selected target horizontal edge lock-on from the 2D image;

perching maneuver logic responsive to real-time range data from rangefinder for positioning and orienting the craft above the target horizontal edge;

perching maneuver logic using rangefinder data for approaching and positioning the multi-rotor craft from above and adjacent to the target horizontal edge corner vertical virtual surface for descending at a craft pitch angle within proximity to engage the craft claw with the horizontal edge surface;

whereby the engaged claw suspends the craft over the target edge in a manner providing a stable vantage position for the camera.

2. The multi-rotor craft with perching function as in claim 1, wherein the rangefinder sensor is chosen from a group of rangefinder sensors consisting of ultrasonic, RF, stereoscopic camera, laser, trigonometric based stadiometric or parallax and visual FVC.

3. The multi-rotor craft with perching function as in claim 1, wherein the sensor array applies sensor fusion for combining of sensory data or data derived from disparate sensors for resulting information with higher reliability and resolution than possible when these sensors are used individually.

4. The multi-rotor craft with perching function as in claim 1, further comprising controller input instructions from wireless video transmissions with the aid of basic onboard instrumentation and sensors including 3D accelerometer, 3D Magnetometer, 3D Gyro for remote FPV steering to the target horizontal edge.

5. The multi-rotor craft with perching function as in claim 1, further comprising two cameras, one for FPV flight visuals and data content recording and one for manual flight control.

6. The multi-rotor craft with perching function as in claim 1, further comprising pressure sensors on claws.

7. The multi-rotor craft with perching function as in claim 1, further comprising claws integrated with deployable-retractable landing gear extensions.

8. The multi-rotor craft with perching function as in claim 1, further comprising rotor boom claws in deployable-retractable recursive segments.

9. The multi-rotor craft with perching function as in claim 1, further comprising slidable anchor pivoting end to craft anchor handle and distal end claw hook.

10. A method for perching a multi-rotor craft using a claw mechanism coupled to the craft body comprising the steps of:

creating a craft housing containing electronics for electronically controlling a multi-rotor craft configuration;

providing the electronics with logic comprising a flight control system having a processor electronically coupled with supporting electronic components, array of rotors, sensor array, power source, at least one wireless receive-transmitter pair and at least one camera;

coupling electronic speed controllers for controlling each rotor with propeller;

reading instructions from a receiver for commandering the electronic speed controllers in directing synchronized rotor array operations configured for a programmed set of specific flight dynamics;

sensing 3D accelerometer, 3D magnetometer, 3D gyro and range finder sensor array signals;

sending the controller translating instructions from the remote wireless transmitter coupled with logic and data inputs from basic onboard instrumentation and sensor array signals;

sending translated instructions from the processor to the electronic speed controllers for commandeering the rotor array in concert generating specific rotor operations obtaining specific craft flight dynamics responsive to logic and sensor signals;

receiving a communication channel data assigned for camera gimbal pitch angle control for remote user selected viewing;

operating an extendable mechanical claw slidably and pivotably coupled to the craft;

identifying a 3D target horizontal edge from camera image processing of 2D images and user selection from the image;

user selecting target horizontal edge from the 2D image and logic using sensors and data for locking on to the physical location represented by the image target horizontal edge;

using the logic responsive to real-time range data from rangefinder for logic for positioning and orienting the craft above the target horizontal edge to perform a perching onto the physical target horizontal edge, and using logic instructing controller to position craft to descend in a pitched angle for engaging the claw with the target horizontal edge responsive to rangefinder data for approaching and positioning the multi-rotor craft from above and adjacent to the target horizontal edge corner vertical virtual surface with craft descending at a pitch angle within proximity to engage at least one claw with the horizontal edge surface.

11. The method for perching a multi-rotor craft using a claw as in claim 10 further comprising the steps of selecting a rangefinder sensor from a group of sensors consisting essentially of ultrasonic, RF, stereoscopic camera, laser, trigonometric based stadiometric or parallax and visual FVC.

12. The method for perching a multi-rotor craft using a claw claw as in claim 10 further comprising the steps of selecting sensors from a sensor array using sensor fusion for combining of sensory data or data derived from disparate sensors for generating resulting information for logic and data.

13. The method for perching a multi-rotor craft using a claw claw as in claim 10 further comprising the steps of selecting receiving controller input instructions from wireless video transmissions with the aid of basic onboard instrumentation and sensors including 3D accelerometer, 3D Magnetometer, 3D Gyro for remote FPV steering to the target horizontal edge.

14. The method for perching a multi-rotor craft using a claw claw as in claim 10 further comprising the steps of using two cameras, one for FPV flight visuals and data content recording and one for manual flight control.

15. The method for perching a multi-rotor craft using a claw claw as in claim 10 further comprising the steps of coupling pressure sensors on claws to signal physical contact with the target edge.

16. The method for perching a multi-rotor craft using a claw claw as in claim 10 further comprising the steps of having claws integrated with deployable-retractable landing gear extensions.

17. The method for perching a multi-rotor craft using a claw claw as in claim 10 further comprising the steps of making rotor boom claws in deployable-retractable recursive segments joined flexibly.

18. The method for perching a multi-rotor craft using a claw claw as in claim 10 further comprising the steps of providing slidable anchor pivoting end to craft anchor handle and distal end claw hook.

\* \* \* \* \*